UNITED STATES PATENT OFFICE.

EDWIN C. POHLÉ, OF RENO, NEVADA.

PROCESS OF RECOVERING VALUES FROM SULFID ORES.

No. 811,085.　　　　　Specification of Letters Patent.　　　Patented Jan. 30, 1906.

Application filed June 1, 1905. Serial No. 263,322.

*To all whom it may concern:*

Be it known that I, EDWIN C. POHLÉ, a citizen of the United States, residing at Reno, in the county of Washoe and State of Nevada, have invented certain new and useful Improvements in Processes of Recovering Values from Sulfid Ores; and I do hereby declare the following to be a full, clear, and exact description of the invention, such as will enable others skilled in the art to which it appertains to make and use the same.

In many parts of the country are found deposits of sulfids containing gold and silver associated with base metals, including copper, and which by reason of their low grade and the absence of lead in material quantities are not adapted for smelting and which also, by reason of their character, are not adapted for treatment by a wet process directly with the recovery of a fair percentage of their assay value.

The object of my invention is a process by which such ores may be treated to recover substantially all of their contained gold and silver and such copper as may be present in an economical manner. This object I accomplish by a combined dry and wet process which is hereinafter described and claimed.

It is well known that solutions of the cyanids of the alkali metals dissolve both gold and silver as well as copper; but it is found when ores such as are above described are so treated only a portion of the gold and silver is dissolved, so much of the values, mainly silver, remaining in the tailings that the process is not available. I avoid this objection by subjecting the ore to a preliminary treatment by which the metals are transformed into a readily-soluble condition.

In detail my process is as follows: The ore is first crushed to the desired fineness, which will vary according to the ore from four to forty mesh. If the quantity of sulfur in the ore is insufficient to theoretically satisfy the reaction, sulfur-bearing material, such as pyrites, is added. The ore is then subjected to a chloridizing-roast with sodium or calcium chlorid. For this purpose the pulverulent ore is intimately mixed with, for instance, common salt, sufficient being used to transform the contained metals into chlorids, as may be calculated after analysis of the ore. The mixture is then subjected to a heat just sufficient to accomplish the reaction between the chlorid and the metallic sulfids in an oxidizing atmosphere. This roasting may be carried on in a muffle with free access of air to the ore or in any desired way. I prefer, however, that the mixture of ore and chlorid be subjected to the products of combustion in the presence of an excess of air. For this purpose any of the usual roasting-furnaces may be used—for instance, an ordinary revolving roaster—and the heat and flame required for the roasting may be obtained from fuel burning in a fire-chamber communicating directly with the roasting-chamber. The roasting should be done under a forced draft produced either by a blast or by an exhaust at the outtake, or both.

It is well known that in all roastings of ores there occur losses of values due to volatilization and that in subjecting ores to a chloridizing-roast a larger proportion of the metals are lost by becoming volatile chlorids, which pass off with the products of combustion at the temperature of the roast. This loss is increased in proportion to the temperature at which the roast is conducted, and I therefore in practicing my process employ a temperature as low as is compatible with effecting the reaction. In order to avoid losses otherwise unavoidable from this source, I pass the products of combustion and the fumes coming from the roasting-chamber through a filter-screen or screens by which the metallic fumes will be collected. These screens will be formed of textile material which may be maintained in a wet condition by suitable means. The filter-screens will be removed from time to time as they become clogged and the collected values recovered by any of the usual metallurgical processes. After the mixture has been subjected to the heat and oxidation a sufficient time it is withdrawn from the furnace continuously or intermittently and allowed to cool, and during the cooling it will be found that the reaction will continue if the mass still contains any unchanged metallic sulfids.

The reason why the gold chlorid is not dissolved or washed out with the copper when the ore is leached with water is that the absence of auric chlorid in the product of the chloridizing-roast is that it forms at a temperature not to exceed 280° Fahrenheit; but as the temperature increases it is practically decomposed, being completely transformed into aurous chlorid at about 347° Fahrenheit. On increasing the temperature to about 392° Fahrenheit the aurous chlorid will be completely reduced to metallic gold.

Moreover, in the chloridizing-roast ferric sulfate $FeSO_4$ will form, which acts as a reducing agent on gold chlorids. It will be seen, therefore, that at the temperature at which the chloridizing must be carried any auric chlorid formed in the earlier stages will be completely reduced by the higher temperatures of the latter stages of the process and that if by any chance any gold chlorid remained in the roasted ore it would be reduced by the $FeSO_4$ present on the addition of water.

After the ore has cooled it is transferred to a filtering-tank and preferably leached with water. The water will dissolve out any copper present, which subsequently will be recovered by any desired metallurgical process. The water will dissolve also other metallic chlorids, except gold and silver, the sodium sulfate produced in the roast, and especially any acid bodies which may be contained in the roasted ore, the presence of which will cause waste of the cyanid solution subsequently used. The leaching with water may be omitted; but its use will greatly add to the economy of the process. The residue after the leaching with water, or, if that be omitted, the cool ore directly from the chloridizing-roast, is subjected to the ordinary cyanid process for the recovery of the gold and silver. I have found that after leaching with water a solution of potassium cyanid of 0.2 per cent. to 0.4 per cent. strength is sufficient for a complete solution of the gold and silver, the leaching being conducted in the usual manner, and from the resulting solution the gold and silver may be precipitated by zinc or in any desired way.

I claim—

1. The process of recovering values from sulfid ores containing gold, and silver, which consists in mixing the ore with a chlorid, subjecting the mixture to heat in an oxidizing atmosphere, cooling the product, leaching the mass with water, to remove the contained bodies soluble therein, leaching the residue with a solution of a cyanid of an alkali metal, and, finally, precipitating the gold and silver from the solution.

2. The process of recovering values from sulfid ores containing gold and silver, which consists in mixing the ore with a chlorid subjecting the mixture to the flame of combustion with an excess of air, conducting off the gaseous products, condensing and collecting the metallic vapors, cooling the solid products, leaching the mass with a solution of a cyanid of an alkali metal, and precipitating the gold and silver from the solution, substantially as described.

3. The process of recovering values from sulfid ores containing gold, silver and base metals, which consists in mixing the ore with a chlorid, subjecting the mixture to the flame of combustion with an excess of air, conducting off the gaseous products, condensing and collecting the metallic vapors, cooling the solid products, leaching the mass with water to remove the contained bodies soluble therein, leaching the residue with a solution of a cyanid of an alkali metal and precipitating the gold and silver from the solution, substantially as described.

4. The process of recovering values from sulfid ores containing gold and silver which consists in mixing the ore with a chlorid, subjecting the mixture to the flame of combustion with an excess of air, conducting off the gaseous products, condensing and collecting the metallic vapors, cooling the solid products, leaching the mass with a solution of a cyanid of an alkali metal and precipitating the gold and silver from the solution substantially as described.

5. The process of recovering values from sulfid ores containing gold and silver which consists in mixing the ore with a chlorid, subjecting the mixture to heat in an oxidizing temperature, cooling the product, leaching the mass with water to remove the contained bodies soluble therein, leaching the residue with a solvent of gold and silver, and finally precipitating the gold and silver from the solution.

6. The process of recovering values from sulfid ores containing gold and silver, which consists in roasting the ore in contact with the flame of combustion with an excess of air, conducting off the products of combustion and resulting vapors by a forced draft, condensing the metallic vapors and filtering them from the permanent gases, substantially as described.

7. The process of recovering values from sulfid ores containing gold and silver, which consists in mixing the ore with a chlorid, subjecting the mixture to the flame of combustion with an excess of air, conducting off the products of combustion and resulting metallic vapors by a forced draft, condensing the metallic vapors and filtering them from the permanent gases, substantially as described.

In testimony whereof I have signed my name to this specification in the presence of two subscribing witnesses.

EDWIN C. POHLÉ.

Witnesses:
WALTER J. HARRIS,
A. P. LEROUX.